Oct. 19, 1954
R. KUNIN ET AL
2,692,244
DEIONIZATION OF FLUIDS
Filed Aug. 24, 1950
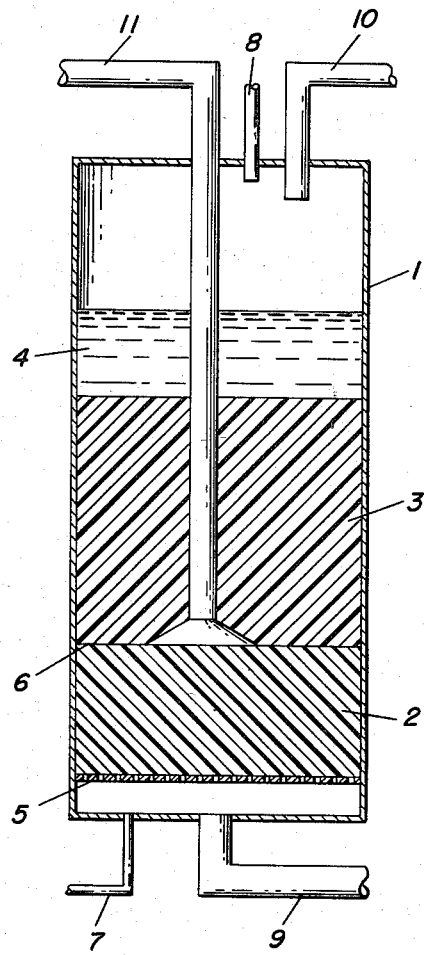
INVENTORS.
Robert Kunin
Francis X. McGarvey
BY
John F. Bergin
Attorney Patented Oct. 19, 1954

2,692,244

UNITED STATES PATENT OFFICE 2,692,244

DEIONIZATION OF FLUIDS

Robert Kunin, Trenton, and Francis X. McGarvey, Haddon Heights, N. J., assignors to Rohm & Haas Company, Philadelphia, Pa., a corporation of Delaware Application August 24, 1950, Serial No. 181,176

7 Claims. (Cl. 260—2.2)

This invention relates to the deionization of fluids, particularly of aqueous solutions. It relates to the removal of ions from fluids by bringing them in contact with mixtures of certain cation-exchange and certain anion-exchange materials. More particularly, it relates to a cyclic process of deionizing fluids by bringing them into contact with a mixture of a cation-exchange resin and an anion-exchange resin, thereafter resolving the mixture of resins into layers of the individual components in the same container, regenerating each component separately while the layers are in contact, and finally remixing the regenerated resins.

This application is a continuation-in-part of our application Serial No. 115,973, filed September 16, 1949, now abandoned, which, in turn, was a continuation-in-part of application Serial No. 28,724, filed May 22, 1948, now Patent No. 2,578,937. In application Serial No. 28,724, the process claimed involves the deionization of fluids with a mixture of certain cation-exchangers and anion-exchangers, the separation of the resins in the mixture, the removal of one of them to a second container and the separate regeneration of the resins, followed by remixing. The process of the instant application does not require the removal of either resin from its container during regeneration and thus has the advantage of lower costs of equipment and operation and greater efficiency.

It has heretofore been suggested to employ a mixture of cation- and anion-exchange materials. Such suggestions, however, have not been acted upon commercially, either because no practical provision was made for the regeneration of the ion-exchangers or the mixtures of ion-exchangers were such that they merely substituted one ion for another and did not deionize. The process of this invention avoids these difficulties and provides a method which can be practiced on the largest commercial scale and which removes the ions and, if desired, even silica from fluids. By this process, for example, ions can be removed from raw water so completely that the raw water is converted into the full equivalent of triple-distilled water.

The process of this invention is best described with reference to the attached drawing. The figure represents a drawing in section of an ion-exchange unit comprising a cylindrical tank in which is located a lower layer of a cation-exchange material and an upper layer of an anion-exchange resin, which tank is equipped with ports to permit the passage of a liquid therethrough in either vertical direction and also to permit the passage of air through the tank from the bottom and which is also equipped with a conduit extending vertically from the top of the tank to the level of the surface of said cation-exchange material.

In the process of this invention a container, 1, preferably a cylindrical tank, is charged with both the cation-exchange material and the anion-exchange material, preferably in the form of small granules or spheroids. The ion-exchangers are supported on slotted or drilled plate 5 or other suitable retainer. The cation-exchanger is shown in the figure as layer 2 and the anion-exchanger as layer 3. The ion-exchangers can be put into the tank in any order or as a mixture of the two. In any case, the exchangers are covered with water, 4, and are thoroughly and intimately mixed. This is done conveniently by passing air under pressure through inlet 7 up through the tank, from which it escapes through a suitable vent, 8. After the ion-exchangers are completely mixed, the supply of air is cut off, the water is drained off rapidly through pipe 9 to the level of the bed, and the mixture of ion-exchangers is allowed to settle. The fluid to be deionized is then introduced into tank 1 through inlet 10 and flows down through the mixed bed of ion-exchangers and is removed as effluent through pipe 9. During passage through the mixed bed, all of the cations are adsorbed by the cation-exchanger and are replaced in solution by hydrogen ions from the cation-exchanger. At the same time, the anions in the fluid are adsorbed by the anion-exchange resin and are replaced by hydroxyl ions. These hydroxyl ions and the hydrogen ions instantly neutralize each other with the formation of water. After the mixed bed has adsorbed its full capacity of ions, the bed is taken out of service and is regenerated. The first step in regenerating the mixture of ion-exchangers is to resolve it into its components. This is done by hydraulic classification or stratification, during which water is passed upflow from pipe 9 at a fairly rapid rate through the tank. The rate of flow is adjusted so that the less heavy particles of anion-exchange resin are carried to the upper part of the tank while the heavier particles of cation-exchanger remain at the bottom. The result is that the ion-exchangers form two definite layers in the tank, the heavier cation-exchanger forming the lower layer, 2, and the lighter anion-exchange resin forming the upper layer, 3. A solution of alkali, for example, a 2–10% solution of sodium hydroxide, is then admitted at the top of the tank through inlet 10 and is passed down through both layers 2 and 3 of the ion-exchangers. This reconverts the anion-exchange resin, 3, to the hydroxyl form. Furthermore, the sodium ions replace calcium ions in bed 2. Both layers are then rinsed free of alkali with water. When regeneration and washing of bed 3 is complete, a solution of a strong mineral acid, preferably sulfuric acid or hydrochloric, is admitted through pipe 11 which extends just to—or very slightly below—the interface, 6, of layers 2 and 3. The acid passes down through bed 2 and reconverts the cation-exchanger to the hydrogen or acid form. When regeneration is complete, water is admitted for the purpose of rinsing and of loosening the beds and the two exchangers are then thoroughly remixed, preferably by blowing with air admitted at inlet 7. The water is then drained off rapidly, the mixture of ion-exchangers is settled quickly, and the cycle is complete.

Instead of using pipe 11 which extends down through container 1, inlets can be placed around tank 1 at the level 6 of the interface of the two beds or layers of ion-exchangers for the admission of the acid-regenerant. It is apparent that other modifications can be made in the process of this invention without departing from the spirit of the invention, which is one of adsorbing ions on a mixed bed of cation-exchange material and anion-exchange resin, hydraulically classifying or separating and stratifying the exhausted components of the mixture within one container, passing an alkali-regenerant through the layer of anion-exchanger contacting only the layer of cation-exchanger with an acid-regenerant, rinsing both resins and intimately remixing them, and finally settling the mixture to form a mixed bed or layer of the exchangers. Thus, for example, the stratified exchangers can be mixed by means of an agitator inserted into the container. Alternatively, the acid-regenerant can be admitted from the bottom of the container and its level controlled so that it does not rise above the top of the layer of cation-exchanger. Or two or more containers of the mixture of ion-exchangers, or "columns" as they are known in the trade, may be used so that one column is always available for deionization while another is undergoing regeneration.

The mixtures of exchange materials that may be used in the process of this invention are those mixtures in which the component resins, when exhausted and wet, have a difference in density of about 0.1 gram/cc. or greater. The particle size of the resins and the uniformity of the particle size also have some effect on stratification. Commercial grades of ion-exchange resin currently on the market have a particle size of from twenty to fifty mesh, with the greater portion of the particles within the range of 20–30 mesh. Such commercial mixtures can be readily stratified for regeneration by this invention when the resins have the aforementioned difference in density of 0.1 gram/cc. With exchange materials that are carefully screened to obtain an even more uniform particle size, and particularly if the particle size of the more dense resin is lower than the particle size of the less dense resin, an even smaller difference in the densities down to 0.05 gram/cc. will suffice. The greater the difference in densities and the more uniform the particle size, the more readily can the mixture be separated.

The cation-exchange materials which we have used in the practice of the invention include the sulfated or sulfonated phenol-formaldehyde resins such as are disclosed in United States Patents Nos. 2,191,853; 2,228,159; 2,228,160; 2,319,359, and 2,204,539, the sulfonated styrene-divinyl benzene resins described in United States Patent No. 2,366,007, particularly those containing over 10% copolymerized divinyl benzene, the dense, sulfonated carbonaceous materials, commonly known as "carbonaceous zeolites," such as are described in United States Patents Nos. 2,191,060 and 2,382,334, and the cross-linked polymers of acrylic or methacrylic acid such as are described in United States Patent No. 2,340,111.

The anion-exchange resins which we have used in the practice of the invention are resins of the type disclosed in the copending applications of Charles H. McBurney, Serial Nos. 759,308 and 759,309, filed July 5, 1947, now Patent Nos. 2,591,573 and 2,591,574 respectively, and Serial No. 20,836, filed April 13, 1948, now Patent No. 2,635,061. In these resins, the polar groups are amine or quaternary ammonium groups which are attached through alkylene groups to aromatic rings of a base resin having a cross-linked or three-dimensional molecular structure. Preferably, the base resin is a styrene polymer that is cross-linked either by being copolymerized with divinyl benzene or by subsequent reaction with a chloromethylating agent, such as the chloromethyl ethers $CH_3OCH_2Cl$ and $ClCH_2OCH_2Cl$ or formaldehyde and hydrogen chloride, in the presence of a Friedel-Crafts condensing agent, such as aluminum chloride. The alkylene groups that join the amine or quaternary ammonium groups to the aromatic rings of the base resin are also introduced by reaction of the polymeric material with a chloromethylating agent in the presence of a Fridel-Crafts condensing agent and, when this reaction is used to effect both the cross-linking of the base resin and the introduction of the alkylene bridges, the two effects may be simultaneously accomplished. The amine or quaternary ammonium groups are introduced by reacting the chloromethylated base resin with a primary or secondary amine or mixture thereof or a tertiary amine.

The following example illustrates the preparation of these anion-exchange resins.

*Example 1*

A. Into a one-liter, three-necked, balloon flask equipped with thermometer, mechanical stirrer, and reflux condenser were poured four hundred milliliters of water and thirty-four milliliters of a 1.5% aqueous solution of magnesium silicate. Agitation was begun and a solution containing 97.5 grams of styrene, one gram of divinyl benzene, and 1.5 grams of ethyl styrene, with one gram of benzoyl peroxide dissolved therein, was added to the contents of the flask. The stirred mixture was then heated to 90° C. and held there for one and one-half hours, after which the mixture was heated at refluxing temperature for an additional one and one-half hours. The reaction mixture was then cooled to room temperature and the solid spheroids of the copolymer were separated from the liquid by decantation and filtration, air-dried, and finally oven-dried for two hours at 125° C.

In a similar manner, copolymers containing up to 10% of divinyl benzene may be prepared.

B. Fifty grams of the beads of copolymer prepared in Part A above were placed in a one-liter, three-necked, balloon flask equipped with thermometer, mechanical stirrer, and reflux condenser. This amount corresponds to 0.5 mole of styrene in the form of a cross-linked copolymer. One hundred grams (1.25 moles) of chloromethyl ether, having the formula $CH_3$—O—$CH_2Cl$, was added and the mixture was allowed to stand at room temperature for fifteen minutes, during which time the beads of copolymer swelled. The mixture was then diluted with 115 milliliters of petroleum ether (boiling point, 30° C.–60° C.) and agitation was begun. The reaction mixture was cooled to 0° C. by means of an ice-salt bath and, at this point, thirty grams (0.23 mole) of anhydrous powdered aluminum chloride was added in small portions over a period of one hour, after which the mixture was stirred at 0° C. for two hours. Then five hundred millilters of ice water was slowly added in order to decompose the excess of aluminum chloride and chloromethyl ether. The resultant mixture was stirred for thirty minutes and was filtered. The beads were first dried in air, then washed several times with water, and finally dried in an oven at 125° C. for two hours.

The beads contained 21.97% chlorine by analysis.

C. In a five-hundred milliliter, three-necked, balloon flask, equipped with an agitator, reflux condenser, thermometer, and a gas-inlet tube, were placed 115 milliliters of benzene and fifty grams of the chloromethylated beads prepared in Part B above. Agitation was begun and the mixture was heated to refluxing temperature and held there for thirty minutes, during which time the beads swelled. The mixture was cooled to 20° C. and was saturated with anhydrous trimethylamine gas. The mixture was then heated to 50° C.–55° C. and held there for four hours while a steady stream of trimethylamine was passed therethrough. The mixture was then cooled to room temperature and allowed to stand overnight, after which the beads were filtered off, washed twice with benzene, and air-dried. The dried beads, free of benzene, were then mixed with a 10% aqueous solution of sulfuric acid for two hours, after which they were washed thoroughly with water and were finally converted to the form of the quaternary ammonium hydroxide by being stirred with a 15% aqueous solution of sodium hydroxide. The final product was washed with water until the wash-water no longer gave a pink color with phenolphthalein. The product thus obtained is a strongly basic quaternary ammonium type anion-exchange material. A weakly basic anion-exchange material is obtained by using a primary or secondary amine for the tertiary amine in the amination step. The polyethylene polyamines, such as diethylene triamine, triethylene tetramine, and tetraethylene pentamine, are particularly useful in the preparation of the weak base type.

The anion-exchange resins of this class in the form of their hydrogen chloride salts have an actual density, when wet, of approximately 1.10 to 1.15 grams per cc. whereas the sulfonic acid type of cation-exchange resins presently available in commerce, when wet and exhausted, have actual densities of the order of 1.30–1.38 grams per cc., and the cross-linked polyacrylic acid or polymethacrylic acid type have actual densities of the order of 1.20–1.25 grams per cc. These substantial differences in densities between the anion- and cation-exchange resins permit their ready stratification by passing water upwards through a bed of mixed resin at such a rate that the anion-exchange resin is carried to the top of the column, whereas the heavier cation-exchange resin remains in the lower portion. An upflow rate of two to six gallons per square foot per minute, depending upon the particular resins to be stratified, is satisfactory.

Following is an example which illustrates how the process of this invention is carried out.

*Example 2*

Into an ion-exchange column four inches in diameter and equipped as shown in the figure of the drawing was placed a mixture of a cation-exchange resin and an anion-exchange resin. The latter was a product of the process set forth in Example 1 above, and the cation-exchange resin was in the hydrogen form and was a sulfonated copolymer of divinyl benzene and styrene, which resin is a commercially available product made by the process of United States Patent No. 2,366,007. The anion-exchange resin had a capacity of 1.13 milliequivalents per gram, when wet, and the cation-exchange resin had a capacity of 2.27 milliequivalents per gram, when wet. The mixture contained three liters of the anion-exchange resin and one and one-half liters of the cation-exchange resin. A total of 880 liters of raw water, containing one hundred parts per million (p. p. m.) of dissolved materials and having a resistivity of about three thousand ohms/cm. and which was taken directly from the Delaware River, was passed downflow through the column. The effluent was tested according to standard water-analysis technique and was found to be absolutely free of metal ions, anions, and silica. Furthermore, the effluent had a pH of 6.5–7.0 and a resistivity of over one million ohms/cm., as determined by means of a conventional conductivity (Wheatstone) bridge. Thus, the effluent was deionized water of higher purity than is required by the specification for distilled water as recorded in the United States Pharmacopoeia.

The exhausted mixture of resins was then regenerated as follows: Water was passed upflow through the column at a rate of four gallons per square foot per minute for a period of fifteen minutes. There occurred a pronounced separation of the resins, with the dark-brown cation-exchange resin remaining as a layer in the bottom of the column and the orange anion-exchange resin rising to the top. The passage of water was stopped, and the bed was allowed to drain by gravity. There resulted a stratified bed of cation-exchange resin and anion-exchange resin with a sharply defined interface between the layers. From the top of the column was passed downflow through both layers five liters of a 4% aqueous solution of sodium hydroxide. The beds were rinsed with fifteen liters of the deionized water prepared above. A one-inch inlet tube, corresponding to conduit 11 in the figure of the drawing, was adjusted vertically until its end was at the level of the interface of the two layers of resin. Then three liters of a 5% solution of sulfuric acid was passed down through the tube and allowed to diffuse slowly through the bed of cation-exchange resin. Ten liters of deionized water was passed down through both beds in order to rinse out the acid regenerant. Water was run into the column until it formed a two-inch layer above the resins. Air under pressure was bubbled rapidly up through the column for about five minutes, during which time the two exchangers became uniformly and intimately mixed. The flow of air was stopped, the mixture of resin was allowed to settle, and the water was drained off to the level of the surface of the mixed bed of resins. The column was then ready for the treatment of more raw water.

Example 3

This same procedure was followed in the deionization of a synthetic water which contained five hundred p. p. m. of dissolved material and had a resistivity of less than one thousand ohms/cm. This water was made by dissolving in each liter of deionized water: 0.278 gram of calcium chloride, 0.355 gram of sodium sulfate, 0.30 gram of magnesium sulfate, 0.21 gram of sodium bicarbonate, and silicic acid in an amount equivalent to 0.005 gram of silica. A total of 175 liters of this synthetic water was passed through the column employed in Example 2. The effluent from the column was completely deionized and was entirely free of silica. The deionized water thus prepared had a resistivity of over one million ohms and a pH of 6.5–7.0. The exhausted mixed bed was stratified, the component resins regenerated, and the regenerated resins remixed in the identical manner described in Example 2.

In the systems heretofore used, wherein the solution being deionized passes alternatively through a bed of one type of exchanger and then through a bed of the other type, it is difficult to obtain a water quality above one hundred thousand ohms/cm. in a two-bed system or above two hundred thousand ohms/cm. in a four-bed system.

Example 4

A mixture of resins in which the anion-exchanger was prepared as illustrated in Example 1, except that dimethyl ethanolamine was used in place of trimethylamine, and in which the cation-exchanger was a copolymer of ninety-five parts of methacrylic acid and five parts of divinyl benzene prepared by the suspension polymerication technique was placed in equipment illustrated in Figure 1. As is described in copending application Serial No. 168,381, filed June 15, 1950, such a mixture is particularly suitable for the deionization of sugar solutions. After exhaustion and washing, the mixture may be stratified for regeneration by passing water up the column at a rate of about 5.2 gallons per square foot per minute. The stratified bed may then be regenerated by the procedure of Example 2.

This process differs from that described in application Serial No. 28,724, filed May 22, 1948, in that the resins are herein merely stratified in the original container and one is not removed as in the process claimed in the former application. Furthermore, in the preferred method of carrying out the process of this application, the alkali regenerant for the anion-exchange resin passes through both layers of the stratified bed. It should be pointed out, however, that, if desired, the alkali regenerant may be withdrawn after it passes through the anion-exchanger as, for example, through openings that may be provided in the container at the level of the interface 6, whereby the water in the column below the interface remains in the column and substantial contact of alkali regenerant with the cation-exchanger is avoided.

As explained in aplication Serial No. 28,724, the rate of upward flow of water best suited for the stratification will depend upon the particle size of the resins, their relative densities, the uniformity in the size of the particles, the temperature of the water, and other factors. All upward flow of the water will "loosen the bed," that is, will cause the bed to expand, and this expansion will increase as the rate of upward flow of water is increased, until eventually all or part of the resin is carried out of the container in the stream of water. The upflow rate which will cause a particle to be carried off and out of the container is known as the rate for "fluidizing" the resin. In stratifying the resins in this process, it is evident that the upflow rate of the water need not reach the fluidizing rate for either component of the mixture of ion-exchangers, but to prevent loss of resin it is desirable to have a retainer screen at the top of the column. In stratifying the mixture of ion-exchangers herein described, a container or column should be used which has a volume which is much greater than the volume of mixed resins to be employed, since the upward flow of water through the column will expand the bed of resins. While the bed is maintained in its expanded condition, the difference in density between the two materials will cause them to stratify, with the lighter anion-exchanger on top and the heavier cation-exchanger on the bottom.

The exhausted anion-exchange resins of the preceding examples, when alone in a column, expand to twice their original volume (100% expansion) when backwashed with water at 50° F. and at an upflow rate of 1.5 gallons per minute per square foot of area of cross-section of the container. The exhausted sulfonated copolymers of styrene as used in Examples 2 and 3 require an upflow rate of about sixteen gallons per square foot per minute for 100% expansion of the bed when used alone. A mixture such as is shown in Example 2 expands to 100% of its original volume at an upflow rate of 4–5 gallons per square foot per minute. At an upflow rate of ten gallons per square foot per minute, the bed expands to about 300% of its original volume; and, at a rate of twelve and one-half gallons per square foot per minute, the bed expands 400%. When the upflow rate reaches about seventeen and one-half gallons per square foot per minute, the quaternary ammonium resin is fluidized and carried off. On the other hand, the sulfonated polystyrene resin is fluidized by an upflow rate of about 40–50 gallons per square foot per minute. In practice, it is preferred to use an upflow rate which expands the bed 100%–400%, at which point stratification occurs rapidly. Obviously higher rates can be used but they entail the use of columns of much greater volume.

The various kinds of cation-exchangers vary somewhat in density. Accordingly, allowances and adjustments in time and upflow rate may need to be made in order to bring about stratification. Similarly, lack of uniformity in the size of particles affects the rate of settling and the flow rates and times required for satisfactory separation. Different adsorbed ions also make some difference in the density of the ion-exchangers but not a sufficient difference to interfere with their stratification. These factors are all compensated for, however, by adjusting the upflow rate to cause 75%–200%, and preferably about 100%, expansion and maintaining that flow rate until stratification of the cation-exchanger and anion-exchanger takes place.

While the foregoing examples illustrate this invention as applied to the deionization of raw water and aqueous salt solutions, it is equally applicable to the removal of cations and anions in general. It is also applicable to the deionization of solutions of organic materials containing polar impurities. Thus, the process is eminently suited for the deionization of sugar solutions because it removes from the sugar solutions the polar impurities which inhibit the crystallization of the sugar without causing a change in the pH of the sugar solution which, in turn, causes inversion.

We claim:

1. The process of regenerating a mixed-bed column of quaternary ammonium anion-exchange resin having a density not in excess of 1.15 when wet and sulfonic acid cation-exchange resin having a density of not less than 1.25 when wet which comprises backwashing the exhausted mixed bed by passing water upward through the column to stratify the bed into an upper layer of anion-exchanger and a lower layer of cation-exchanger, passing a solution of sodium hydroxide downward through both layers of the stratified bed and rinsing, thereafter introducing into the stratified bed at the interface of the two layers a solution of a strong acid, passing said solution of acid downward through the layer of cation-exchanger, and finally remixing the regenerated exchangers.

2. The process of claim 1 wherein the anion-exchange resin is a cross-linked styrene polymer having quaternary ammonium groups joined to the aromatic nuclei of the polymer through methylene groups and wherein the cation-exchange resin is a sulfonated cross-linked styrene polymer.

3. The process of regenerating a mixed-bed column of an anion-exchange resin and a cation-exchange resin in which the density of the cation-exchange resin is at least 0.1 gram per cc. greater than the density of the anion-exchange resin, which comprises backwashing the exhausted mixed bed by passing water upward through the column to stratify the bed into an upper layer of anion-exchange resin and a lower layer of cation-exchange resin, separately regenerating said stratified layers in contact with each other by passing alkaline regenerant downward through the upper layer of anion-exchange resin and passing acid regenerant through the lower layer of cation-exchange resin, and finally remixing the regenerated resins.

4. The process of regenerating a mixed-bed column of an anion-exchange resin and a cation-exchange resin in which the density of the cation-exchange resin is at least 0.1 gram per cc. greater than the density of the anion-exchange resin which comprises backwashing the exhausted mixed bed by passing water upward through the column to stratify the bed into an upper layer of anion-exchange resin and a lower layer of cation-exchange resin, regenerating said stratified layers in contact with each other by sequentially passing alkaline regenerant downward through the upper layer of anion-exchange resin and introducing acid regenerant into the stratified bed at the interface of the two layers and passing it downward through the lower layer of cation-exchange resin, and finally remixing the regenerated resins.

5. The process of regenerating a mixed-bed column of an anion-exchange resin and a cation-exchange resin in which the density of the cation-exchange resin is at least 0.1 gram per cc. greater than the density of the anion-exchange resin which comprises backwashing the exhausted mixed bed by passing water upward through the column to stratify the bed into an upper layer of anion-exchange resin and a lower layer of cation-exchange resin, regenerating said stratified layers in contact with each other by sequentially passing alkaline regenerant downward through the upper layer of anion-exchange resin and introducing acid regenerant at the bottom of the lower layer and passing it upward through the lower layer of cation-exchange resin only, and finally remixing the regenerated resins.

6. The process of regenerating a mixed-bed column of an anion-exchange resin which is a cross linked styrene polymer having basic nitrogen groups joined to the aromatic nuclei through methylene groups and a cation-exchange resin having a density at least 0.1 gram per cc. greater than the density of said anion-exchange resin which comprises backwashing the exhausted mixed bed by passing water upward through the column at a rate sufficient to expand the bed from 75% to 200% until stratification of the anion-exchange resin in an upper layer and cation-exchange resin in a lower layer takes place, allowing said expanded bed to settle, separately regenerating said stratified layers in contact with each other by passing alkali regenerant downward through the upper layer of anion-exchange resin and passing acid regenerant through the lower layer of cation-exchange resin and finally remixing the regenerated resins.

7. The process of regenerating a mixed-bed column of an anion-exchange resin and a cation-exchange resin in which the density of the cation-exchange resin is greater than the density of the anion-exchange resin, which comprises backwashing the exhausted mixed bed by passing water upward through the column to stratify the bed into an upper layer of anion-exchange resin and a lower layer of cation-exchange resin, separately regenerating said stratified layers in contact with each other by passing alkaline regenerant downward through the upper layer of anion-exchange resin and passing acid regenerant through the lower layer of cation-exchange resin, and finally remixing the regenerated resins.

References Cited in the file of this patent

UNITED STATES PATENTS

| Number | Name | Date |
|---|---|---|
| 2,461,505 | Daniel | Feb. 15, 1949 |
| 2,461,506 | Daniel | Feb. 15, 1949 |
| 2,466,662 | Mindler | Apr. 5, 1949 |